US012206181B2

(12) United States Patent
Huang

(10) Patent No.: US 12,206,181 B2
(45) Date of Patent: Jan. 21, 2025

(54) ANTENNA SYSTEM

(71) Applicant: Wistron NeWeb Corp., Hsinchu (TW)

(72) Inventor: Chun-Lin Huang, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 196 days.

(21) Appl. No.: 18/190,478

(22) Filed: Mar. 27, 2023

(65) Prior Publication Data

US 2023/0369759 A1 Nov. 16, 2023

(30) Foreign Application Priority Data

May 11, 2022 (TW) ................................. 111117561

(51) Int. Cl.
*H01Q 3/24* (2006.01)
*H01Q 9/04* (2006.01)
*H01Q 9/06* (2006.01)

(52) U.S. Cl.
CPC ............. *H01Q 3/24* (2013.01); *H01Q 9/0407* (2013.01); *H01Q 9/065* (2013.01)

(58) Field of Classification Search
CPC .......... H01Q 3/24; H01Q 3/38; H01Q 9/0407; H01Q 9/065; H01Q 21/0037; H01Q 21/06
See application file for complete search history.

(56) References Cited

U.S. PATENT DOCUMENTS

2005/0110683 A1 5/2005 Song
2013/0093634 A1* 4/2013 Rowson ............. H01Q 21/0006 343/745
2013/0335290 A1 12/2013 Desclos et al.
2015/0155621 A1* 6/2015 Desclos ................. H01Q 21/28 343/852

FOREIGN PATENT DOCUMENTS

TW 200723600 A 6/2007

* cited by examiner

*Primary Examiner* — Hoang V Nguyen
(74) *Attorney, Agent, or Firm* — McClure, Qualey & Rodack, LLP

(57) ABSTRACT

An antenna system includes a signal feeding element, a first antenna element, a second antenna element, a first selection circuit, a second selection circuit, a first transmission line, a second transmission line, a third transmission line, a fourth transmission line, a fifth transmission line, and a sixth transmission line. The first selection circuit selects one of the first transmission line, the second transmission line, and the third transmission line as a first target transmission line. The selected first target transmission line is coupled between a third connection point and a first connection point. The second selection circuit selects one of the fourth transmission line, the fifth transmission line, and the sixth transmission line as a second target transmission line. The selected second target transmission line is coupled between a fourth connection point and a second connection point.

20 Claims, 8 Drawing Sheets

ANTENNA SYSTEM

CROSS REFERENCE TO RELATED APPLICATIONS

This application claims priority of Taiwan Patent Application No. 111117561 filed on May 11, 2022, the entirety of which is incorporated by reference herein.

BACKGROUND OF THE INVENTION

Field of the Invention

The disclosure generally relates to an antenna system, and more particularly, to an antenna system with a switchable radiation pattern.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Wireless access points are indispensable elements for mobile devices in a room to connect to the Internet at a high speed. However, since an indoor environment can experience serious signal reflection and multipath fading, wireless access points should process signals from a variety of transmission directions simultaneously. Accordingly, it has become a critical challenge for current designers to design a small-size and omnidirectional antenna system in the limited space of a wireless access point.

BRIEF SUMMARY OF THE INVENTION

In an exemplary embodiment, the invention is directed to an antenna system that includes a signal feeding element, a first antenna element, a second antenna element, a first selection circuit, a second selection circuit, a first transmission line, a second transmission line, a third transmission line, a fourth transmission line, a fifth transmission line, and a sixth transmission line. The feeding element is respectively coupled to a first connection point and a second connection point. The first antenna element is coupled to a third connection point. The second antenna element is coupled to a fourth connection point. The first selection circuit selects one of the first transmission line, the second transmission line, and the third transmission line as a first target transmission line. The selected first target transmission line is coupled between the third connection point and the first connection point. The second selection circuit selects one of the fourth transmission line, the fifth transmission line, and the sixth transmission line as a second target transmission line. The selected second target transmission line is coupled between the fourth connection point and the second connection point.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
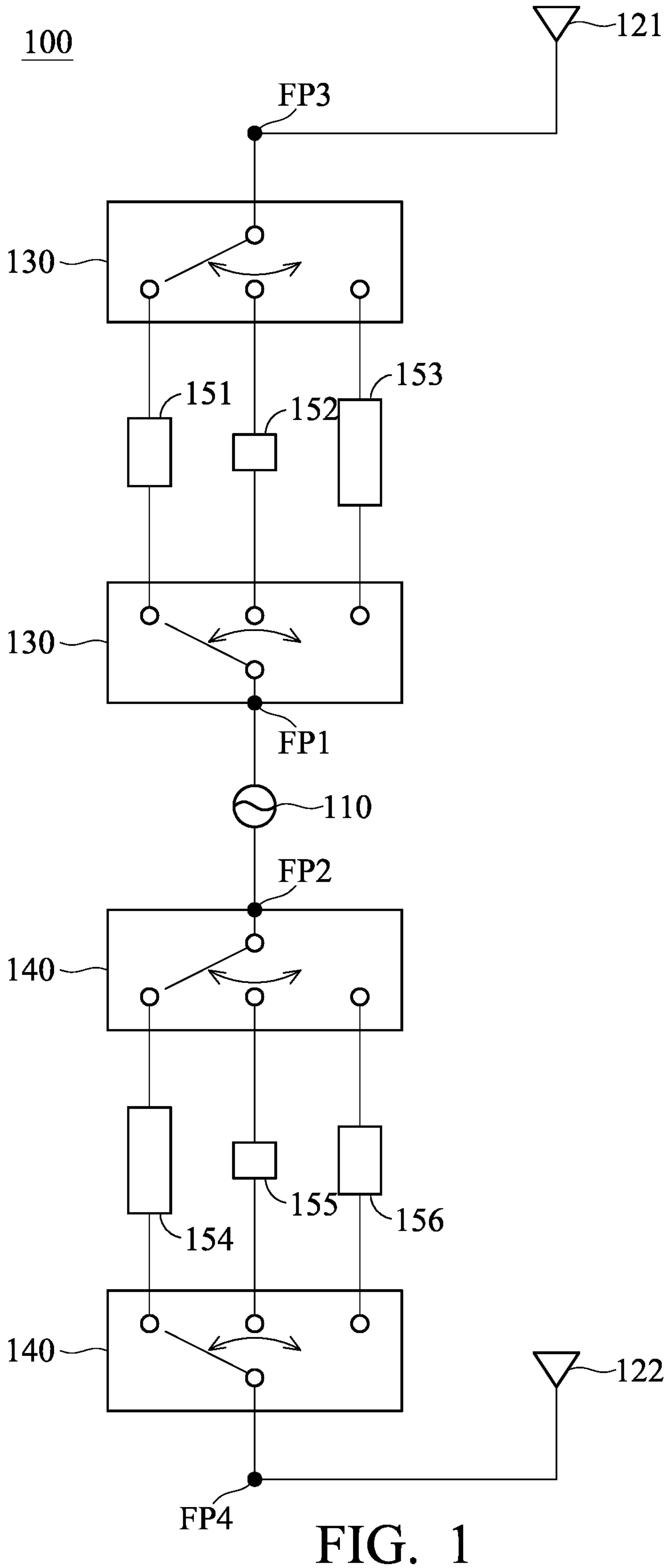
FIG. 1 is a diagram of an antenna system according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s)

as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of an antenna system 100 according to an embodiment of the invention. For example, the antenna system 100 may be applied to a wireless access point, but it is not limited thereto. In the embodiment of FIG. 1, the antenna system 100 at least includes a signal feeding element 110, a first antenna element 121, a second antenna element 122, a first selection circuit 130, a second selection circuit 140, a first transmission line 151, a second transmission line 152, a third transmission line 153, a fourth transmission line 154, a fifth transmission line 155, and a sixth transmission line 156.

The signal feeding element 110 may be implemented with one or more feeding metal elements. For example, the signal feeding element 110 may be coupled to an RF (Radio Frequency) module (not shown) for exciting the antenna system 100. The signal feeding element 110 is respectively coupled to a first connection point FP1 and a second connection point FP2. The shapes and types of the first antenna element 121 and the second antenna element 122 are not limited in the invention. For example, each of the first antenna element 121 and the second antenna element 122 may be a monopole antenna, a dipole antenna, a patch antenna, a loop antenna, a PIFA (Planar Inverted F Antenna), or a hybrid antenna. The first antenna element 121 is coupled to a third connection point FP3. The second antenna element 122 is coupled to a fourth connection point FP4.

The shapes and types of the first transmission line 151, the second transmission line 152, the third transmission line 153, the fourth transmission line 154, the fifth transmission line 155, and the sixth transmission line 156 are not limited in the invention. The first transmission line 151, the second transmission line 152, the third transmission line 153, the fourth transmission line 154, the fifth transmission line 155, and the sixth transmission line 156 may have the same lengths or different lengths. For example, if the first transmission line 151, the second transmission line 152, and the third transmission line 153 have the same lengths, the fourth transmission line 154, the fifth transmission line 155, and the sixth transmission line 156 will have different lengths. Alternatively, if the fourth transmission line 154, the fifth transmission line 155, and the sixth transmission line 156 have the same lengths, the first transmission line 151, the second transmission line 152, and the third transmission line 153 will have different lengths. In some embodiments, the length of the fourth transmission line 154 is longer than or equal to the length of the first transmission line 151, the length of the fifth transmission line 155 is substantially equal to the length of the second transmission line 152, and the length of the sixth transmission line 156 is shorter than or equal to the length of the third transmission line 153.

The first selection circuit 130 may select one of the first transmission line 151, the second transmission line 152, and the third transmission line 153 as a first target transmission line. The selected first target transmission line is coupled between the third connection point FP3 and the first connection point FP1. Furthermore, the second selection circuit 140 may select one of the fourth transmission line 154, the fifth transmission line 155, and the sixth transmission line 156 as a second target transmission line. The selected second target transmission line is coupled between the fourth connection point FP4 and the second connection point FP2. For example, the first selection circuit 130 and the second selection circuit 140 may perform the aforementioned selection processes according to a user input or a control signal of a processor. It should be noted that the first transmission line 151, the second transmission line 152, the third transmission line 153, the fourth transmission line 154, the fifth transmission line 155, and the sixth transmission line 156 are configured to provide the same feeding phases or different feeding phases. For example, if the first transmission line 151, the second transmission line 152, and the third transmission line 153 provide the same feeding phases, the fourth transmission line 154, the fifth transmission line 155, and the sixth transmission line 156 will provide different feeding phases. Alternatively, if the fourth transmission line 154, the fifth transmission line 155, and the sixth transmission line 156 provide the same feeding phases, the first transmission line 151, the second transmission line 152, and the third transmission line 153 will provide different feeding phases. According to practical measurements, the antenna system 100 of the invention can provide an almost omnidirectional radiation pattern by using the first selection circuit 130 and the second selection circuit 140.

The following embodiments will introduce different configurations and detailed structural features of the antenna system 100. It should be understood that these figures and descriptions are merely exemplary, rather than limitations of the invention.

Figure 2:
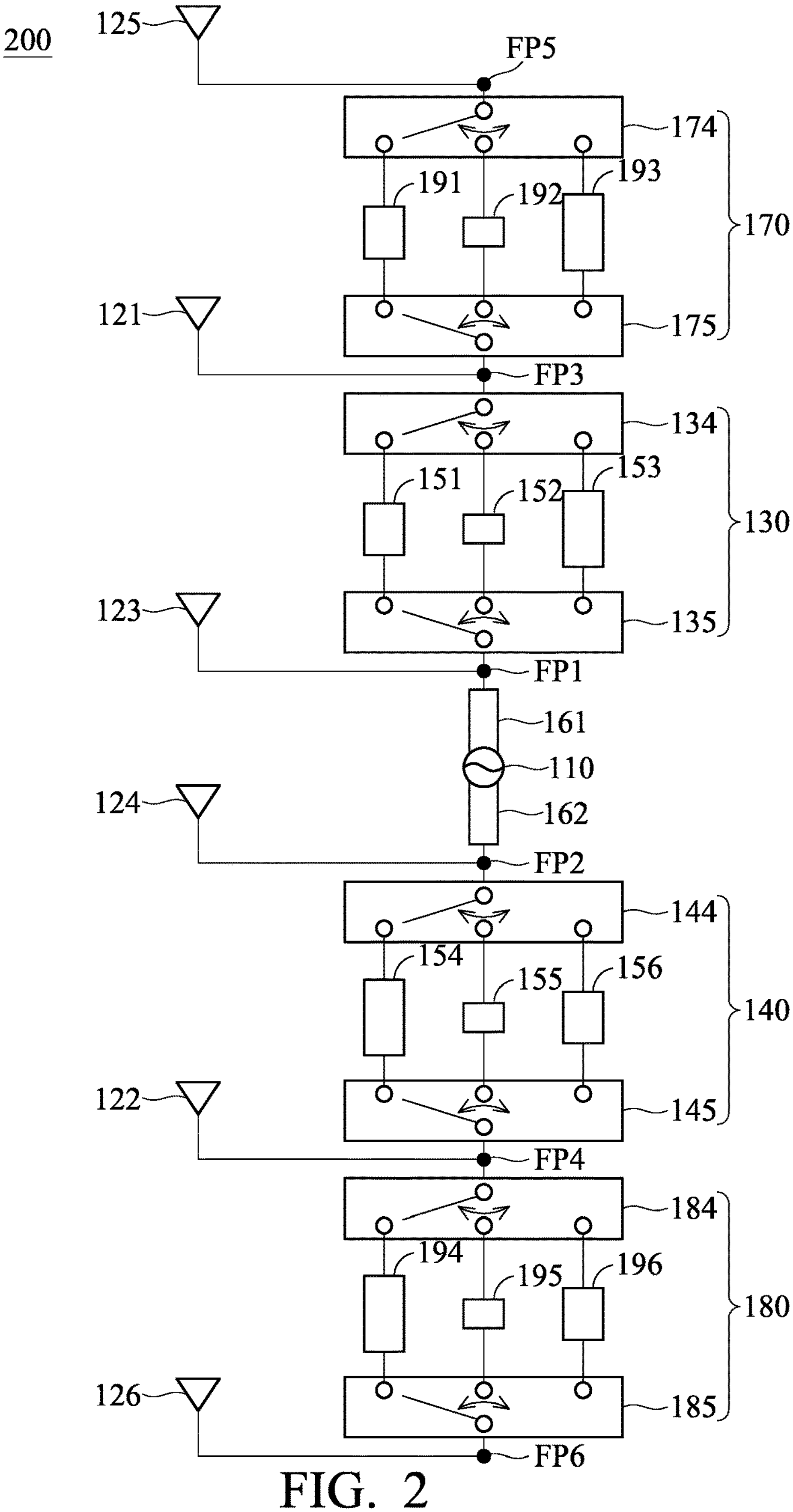
FIG. 2 is a diagram of an antenna system according to an embodiment of the invention.

FIG. 2 is a diagram of an antenna system 200 according to an embodiment of the invention. FIG. 2 is similar to FIG. 1. In the embodiment of FIG. 2, besides the aforementioned elements, the antenna system 200 further includes a third antenna element 123, a fourth antenna element 124, a fifth antenna element 125, a sixth antenna element 126, a first feeding line 161, a second feeding line 162, a third selection circuit 170, a fourth selection circuit 180, a seventh transmission line 191, an eighth transmission line 192, a ninth transmission line 193, a tenth transmission line 194, an eleventh transmission line 195, and a twelfth transmission line 196.

The length of the second feeding line 162 may be substantially equal to the length of the first feeding line 161. The first feeding line 161 is coupled between the first connection point FP1 and the signal feeding element 110. The second feeding line 162 is coupled between the second connection point FP2 and the signal feeding element 110. In some embodiments, each of the first feeding line 161 and the second feeding line 162 substantially have a variable-width straight-line shape for impedance matching adjustments, but it is not limited thereto. The third antenna element 123 is coupled to the first connection point FP1. The fourth antenna element 124 is coupled to the second connection point FP2.

The first selection circuit 130 includes a first switch element 134 and a second switch element 135. Each of the first switch element 134 and the second switch element 135 may be an SP3T (Single Port Three Throw) switch element. Specifically, the first switch element 134 and the second switch element 135 are configured to select one of the first transmission line 151, the second transmission line 152, and the third transmission line 153 as the first target transmission line coupled between the third connection point FP3 and the first connection point FP1.

The second selection circuit 140 includes a third switch element 144 and a fourth switch element 145. Each of the third switch element 144 and the fourth switch element 145 may be an SP3T switch element. Specifically, the third switch element 144 and the fourth switch element 145 are configured to select one of the fourth transmission line 154, the fifth transmission line 155, and the sixth transmission line 156 as the second target transmission line coupled between the fourth connection point FP4 and the second connection point FP2.

The fifth antenna element 125 is coupled to a fifth connection point FP5. The third selection circuit 170 may select one of the seventh transmission line 191, the eighth transmission line 192, and the ninth transmission line 193 as a third target transmission line. The selected third target transmission line is coupled between the fifth connection point FP5 and the third connection point FP3. Specifically, the third selection circuit 170 includes a fifth switch element 174 and a sixth switch element 175. Each of the fifth switch element 174 and the sixth switch element 175 may be an SP3T switch element. For example, the length of the tenth transmission line 194 may be longer than or equal to the length of the fourth transmission line 154, the length of the fourth transmission line 154 may be longer than or equal to the length of the first transmission line 151, and the length of the first transmission line 151 may be longer than or equal to the length of the seventh transmission line 191, but they are not limited thereto. In addition, the second transmission line 152, the fifth transmission line 155, the eighth transmission line 192, and the eleventh transmission line 195 may substantially have the same lengths.

The sixth antenna element 126 is coupled to a sixth connection point FP6. The fourth selection circuit 180 may select one of the tenth transmission line 194, the eleventh transmission line 195, and the twelfth transmission line 196 as a fourth target transmission line. The selected fourth target transmission line is coupled between the sixth connection point FP6 and the fourth connection point FP4. Specifically, the fourth selection circuit 180 includes a seventh switch element 184 and an eighth switch element 185. Each of the seventh switch element 184 and the eighth switch element 185 may be an SP3T switch element. For example, the length of the twelfth transmission line 196 may be shorter than or equal to the length of the sixth transmission line 156, the length of the sixth transmission line 156 may be shorter than or equal to the length of the third transmission line 153, and the length of the third transmission line 153 may be shorter than or equal to the length of the ninth transmission line 193, but they are not limited thereto.

It should be understood that in response to a variety of use requirements, the antenna system 200 may further include more antenna elements, more selection circuits, and more transmission lines. Other features of the antenna system 200 of FIG. 2 are similar to those of the antenna system 100 of FIG. 1. Accordingly, the two embodiments can achieve similar levels of performance.

Figure 3:
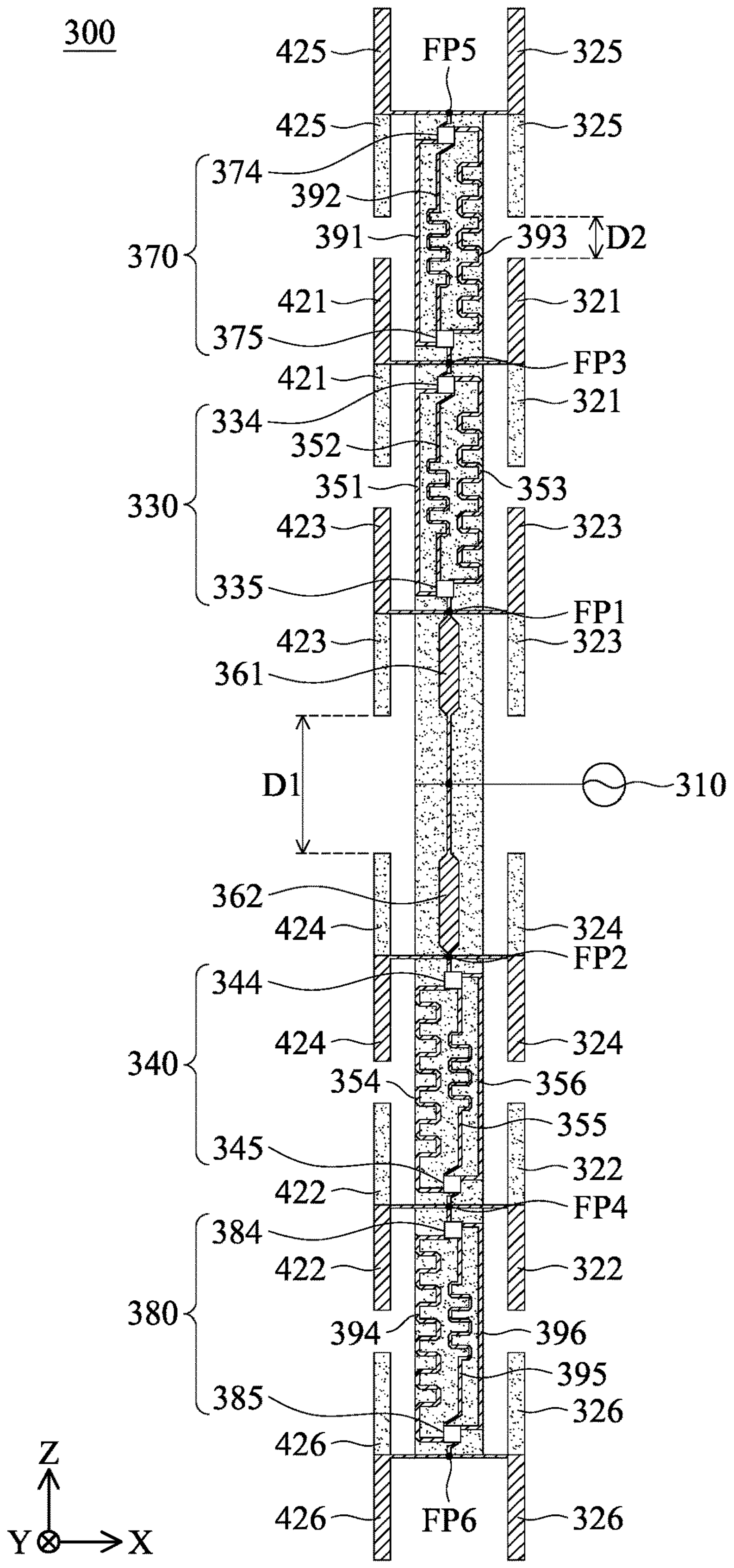
FIG. 3 is a top view of an antenna system according to an embodiment of the invention.

FIG. 3 is a top view of an antenna system 300 according to an embodiment of the invention. FIG. 3 is similar to FIG. 2. In the embodiment of FIG. 3, the antenna system 300 includes a signal feeding element 310, a first antenna element 321, a second antenna element 322, a third antenna element 323, a fourth antenna element 324, a fifth antenna element 325, a sixth antenna element 326, a seventh antenna element 421, an eighth antenna element 422, a ninth antenna element 423, a tenth antenna element 424, an eleventh antenna element 425, a twelfth antenna element 426, a first selection circuit 330, a second selection circuit 340, a first transmission line 351, a second transmission line 352, a third transmission line 353, a fourth transmission line 354, a fifth transmission line 355, a sixth transmission line 356, a first feeding line 361, a second feeding line 362, a third selection circuit 370, a fourth selection circuit 380, a seventh transmission line 391, an eighth transmission line 392, a ninth transmission line 393, a tenth transmission line 394, an eleventh transmission line 395, and a twelfth transmission line 396. In some embodiments, the antenna system 300 can cover an operational frequency band from 5150 MHz to 5850 MHz. Therefore, the antenna system 300 can support at least the wideband operation of WLAN (Wireless Local Area Networks) 5 GHz.

Each of the first antenna element 321, the second antenna element 322, the third antenna element 323, the fourth antenna element 324, the fifth antenna element 325, the sixth antenna element 326, the seventh antenna element 421, the eighth antenna element 422, the ninth antenna element 423, the tenth antenna element 424, the eleventh antenna element 425, and the twelfth antenna element 426 may be implemented with a dipole antenna. The above antenna elements may be distributed over a top surface and a bottom surface of a dielectric substrate (in order to simplify the figure, the dielectric substrate is not displayed in FIG. 3). Specifically, the first antenna element 321 and the seventh antenna element 421 are coupled to a third connection element FP3, so as to form a first antenna array. The second antenna element 322 and the eighth antenna element 422 are coupled to a fourth connection point FP4, so as to form a second antenna array. The third antenna element 323 and the ninth antenna element 423 are coupled to a first connection point FP1, so as to form a third antenna array. The fourth antenna element 324 and the tenth antenna element 424 are coupled to a second connection point FP2, so as to form a fourth antenna array. The fifth antenna element 325 and the eleventh antenna element 425 are coupled to a fifth connection point FPS, so as to form a fifth antenna array. The sixth antenna element 326 and the twelfth antenna element 426 are coupled to a sixth connection point FP6, so as to form a sixth antenna array. In some embodiments, the first antenna element 321, the second antenna element 322, the third antenna element 323, the fourth antenna element 324, the fifth antenna element 325, and the sixth antenna element 326 are arranged in the same straight line. The seventh antenna element 421, the eighth antenna element 422, the ninth antenna element 423, the tenth antenna element 424, the eleventh antenna element 425, and the twelfth antenna element 426 are arranged in another parallel straight line. It should be understood that the seventh antenna element 421, the eighth antenna element 422, the ninth antenna element 423, the tenth antenna element 424, the eleventh antenna element 425, and the twelfth antenna element 426 are used to improve the symmetry of the whole antenna system 300, and they are optional components and may be omitted in other embodiments, without affecting the switching function of the radiation pattern of the invention.

The first selection circuit 330 includes a first switch element 334 and a second switch element 335, and it is switchable between the first transmission line 351, the second transmission line 352, and the third transmission line 353, so as to select a first target transmission line. The second selection circuit 340 includes a third switch element 344 and a fourth switch element 345, and it is switchable between the fourth transmission line 354, the fifth transmission line 355, and the sixth transmission line 356, so as to select a second target transmission line. The third selection circuit 370 includes a fifth switch element 374 and a sixth switch element 375, and it is switchable between the seventh transmission line 391, the eighth transmission line 392, and the ninth transmission line 393, so as to select a third target transmission line. The fourth selection circuit 380 includes a seventh switch element 384 and an eighth switch element 385, and it is switchable between the tenth transmission line 394, the eleventh transmission line 395, and the twelfth transmission line 396, so as to select a fourth target transmission line.

In some embodiments, the antenna system 300 operates in either a first mode, a second mode, or a third mode. In the first mode, the first transmission line 351, the fourth transmission line 354, the seventh transmission line 391, and the tenth transmission line 394 are selected as the first target transmission line, the second target transmission line, the third target transmission line, and the fourth target transmission line, respectively. In the second mode, the second transmission line 352, the fifth transmission line 355, the eighth transmission line 392, and the eleventh transmission line 395 are selected as the first target transmission line, the second target transmission line, the third target transmission line, and the fourth target transmission line, respectively. Furthermore, in the third mode, the third transmission line 353, the sixth transmission line 356, the ninth transmission line 393, and the twelfth transmission line 396 are selected as the first target transmission line, the second target transmission line, the third target transmission line, and the fourth target transmission line, respectively.

Figure 4:
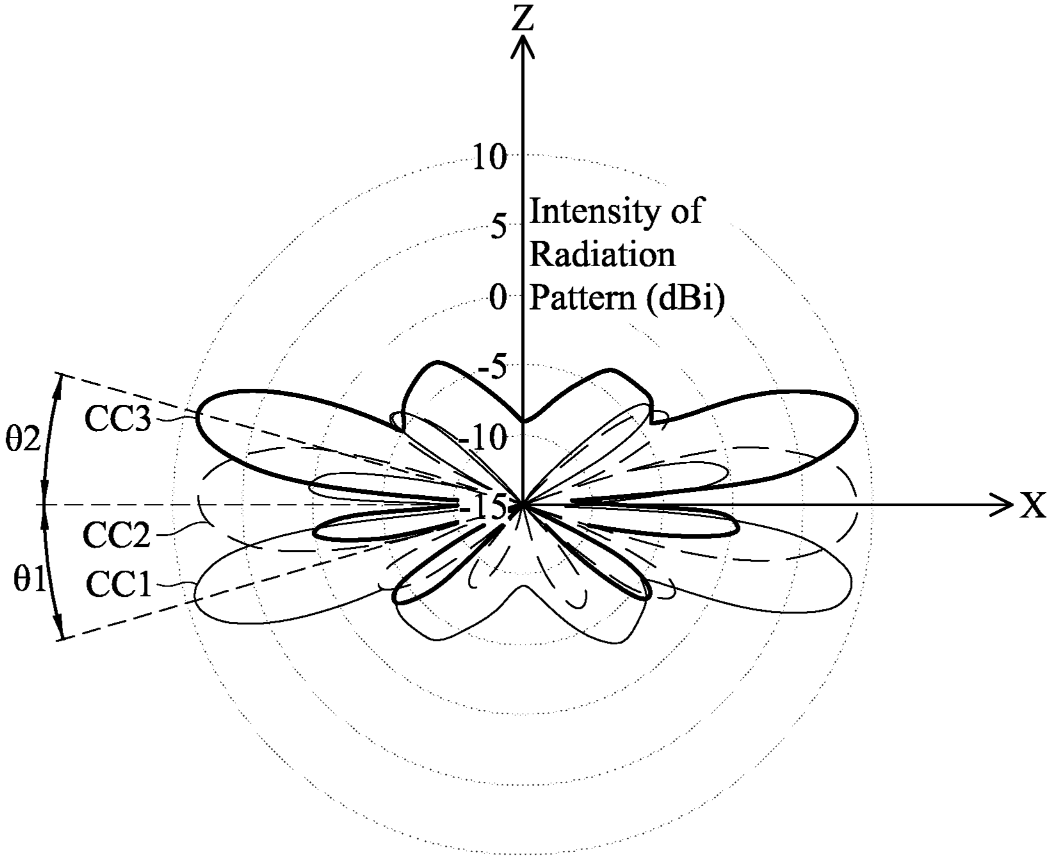
FIG. 4 is a radiation pattern of an antenna system according to an embodiment of the invention.

FIG. 4 is a radiation pattern of the antenna system 300 according to an embodiment of the invention (which may be measured on the XZ-plane). As shown in FIG. 4, a first curve CC1 represents the radiation characteristics of the antenna system 300 operating in the first mode, a second curve CC2 represents the radiation characteristics of the antenna system 300 operating in the second mode, and a third curve CC3 represents the radiation characteristics of the antenna system 300 operating in the third mode. According to the practical measurement of FIG. 4, if the second mode corresponds to a horizontal radiation pattern, the first mode will correspond to a radiation pattern deflecting downward by a first angle θ1, and the third mode will correspond to another radiation pattern deflecting upward by a second angle θ2. Accordingly, the antenna system 300 of the invention can provide an almost omnidirectional and switchable radiation pattern by appropriately controlling the first selection circuit 330, the second selection circuit 340, the third selection circuit 370, and the fourth selection circuit 380. For example, if the antenna system 300 is arranged horizontally on the middle floor of an apartment, the first mode can be used to support low-floor communication, the second mode can be used to support mid-floor communication, and the third mode can be used to support high-floor communication, but it is not limited thereto.

In some embodiments, the element sizes of the antenna system 300 will be described as follows. The first transmission line 351, the sixth transmission line 356, the seventh transmission line 391, and the twelfth transmission line 396 may have the same lengths, which may be from 0.25 to 0.31 wavelength (0.25λ-0.31λ) of the operational frequency band of the antenna system 300. The third transmission line 353, the fourth transmission line 354, the ninth transmission line 393, and the tenth transmission line 394 may have the same lengths, which may be from 0.69 to 0.85 wavelength (0.69λ-0.85λ) of the operational frequency band of the antenna system 300. The second transmission line 352, the fifth transmission line 355, the eighth transmission line 392, and the eleventh transmission line 395 may have the same lengths, which may be from 0.16 to 0.19 wavelength (0.16λ-0.19λ) of the operational frequency band of the antenna system 300. The distance D1 between the third antenna element 323 and the fourth antenna element 324 may be from 0.24 to 0.3 wavelength (0.24λ-0.3λ) of the operational frequency band of the antenna system 300. The distance D2 between the fifth antenna element 325 and the first antenna element 321 may be from 0.04 to 0.06 wavelength (0.04λ-0.06λ) of the operational frequency band of the antenna system 300. The first angle θ1 may be from 10 to 20 degrees, such as about 15 degrees. The second angle θ2 may be from 10 to 20 degrees, such as about 15 degrees. The above ranges of element sizes are calculated and obtained according to many experiment results, and they help to optimize the operational bandwidth and the impedance matching of the antenna system 300. Other features of the antenna system 300 of FIG. 3 are similar to those of the antenna system 200 of FIG. 2. Accordingly, the two embodiments can achieve similar levels of performance.

Figure 5A:
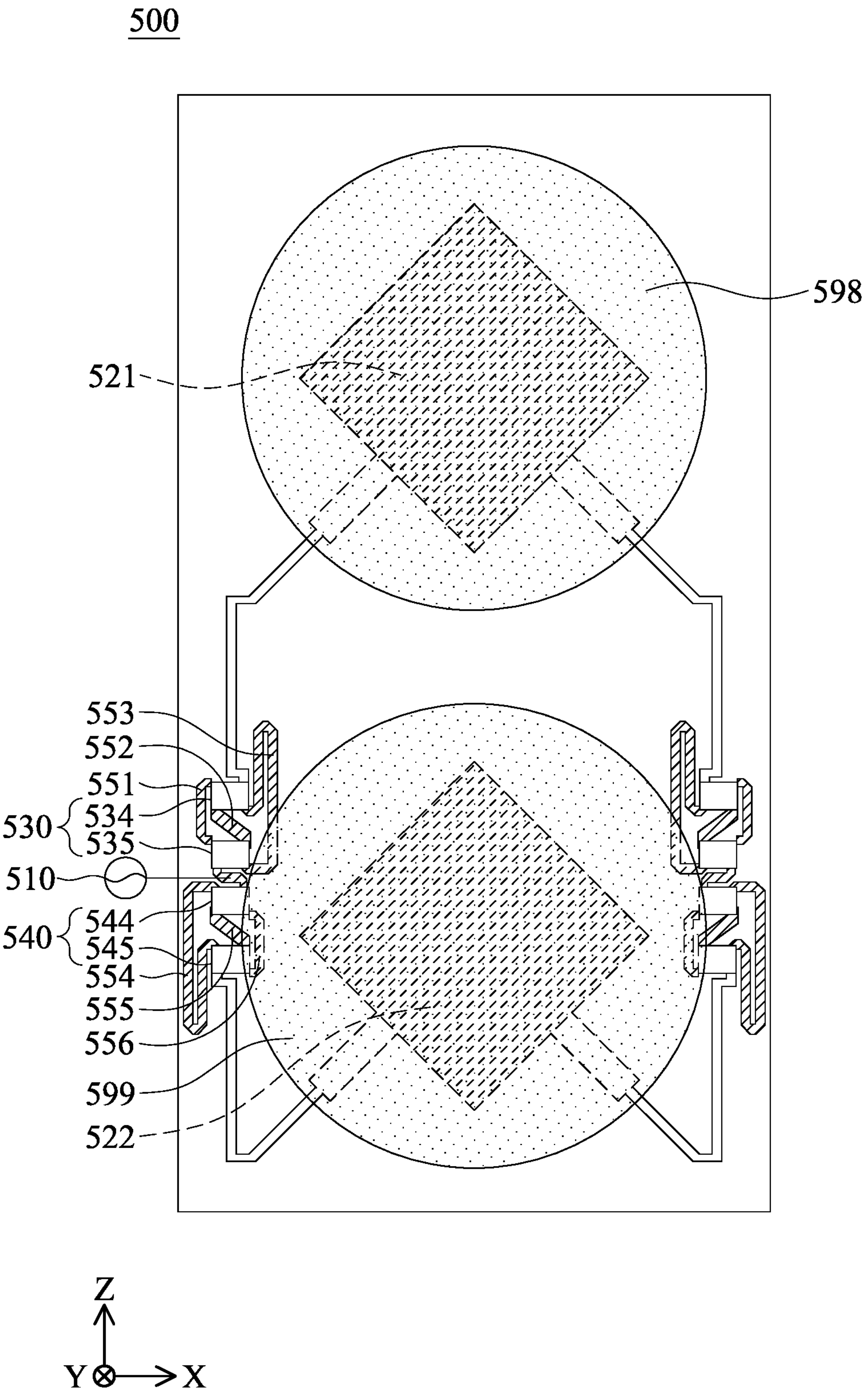
FIG. 5A is a top view of an antenna system according to an embodiment of the invention.
Figure 5B:
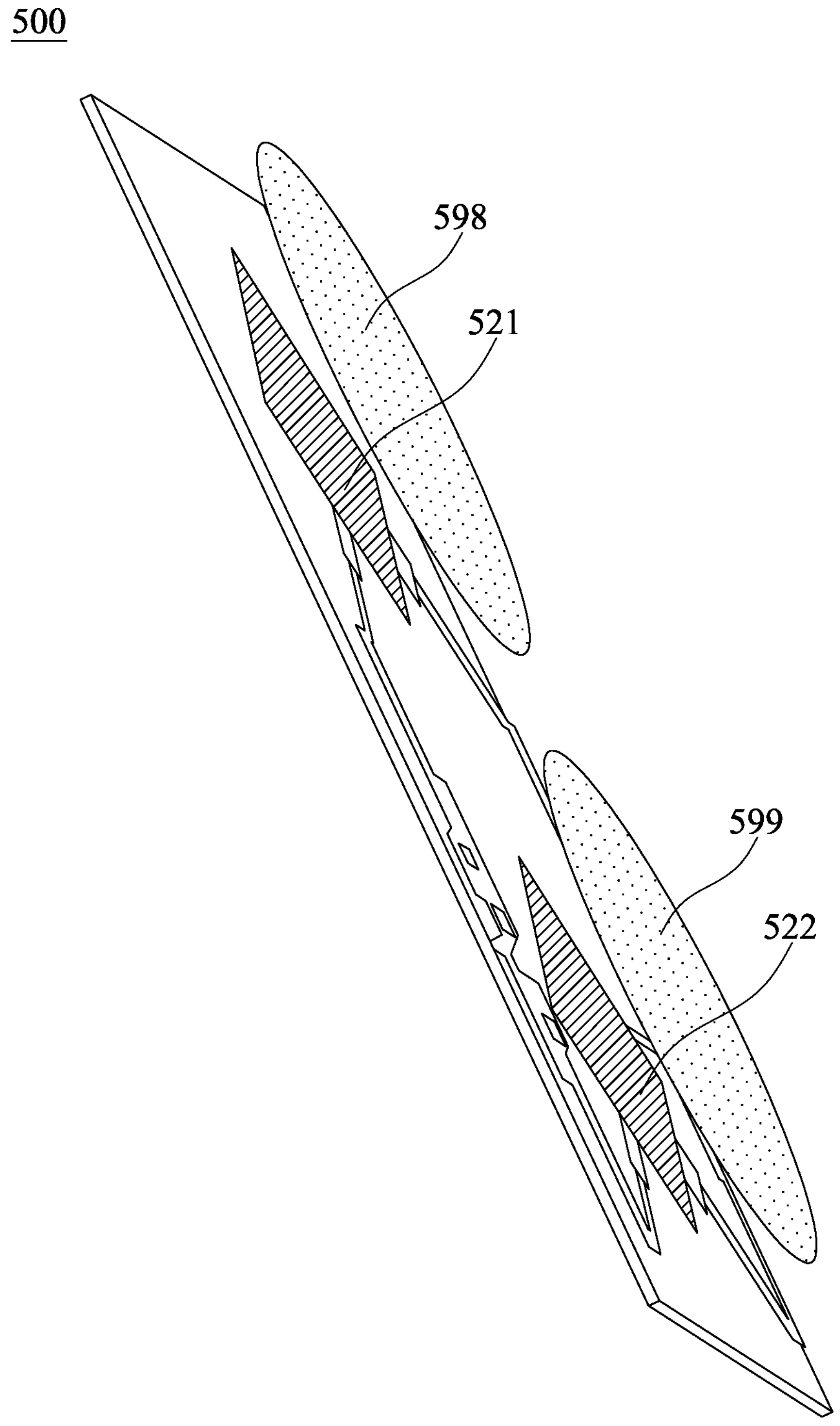
FIG. 5B is a perspective view of an antenna system according to an embodiment of the invention.

FIG. 5A is a top view of an antenna system 500 according to an embodiment of the invention. FIG. 5B is a perspective view of an antenna system 500 according to an embodiment of the invention. Please refer to FIG. 5A and FIG. 5B together. FIG. 5A and FIG. 5B are similar to FIG. 1. In the embodiment of FIG. 5A and FIG. 5B, the antenna system 500 includes a signal feeding element 510, a first antenna element 521, a second antenna element 522, a first selection circuit 530, a second selection circuit 540, a first transmission line 551, a second transmission line 552, a third transmission line 553, a fourth transmission line 554, a fifth transmission line 555, a sixth transmission line 556, a first floating metal element 598, and a second floating metal element 599. The first selection circuit 530 includes a first switch element 534 and a second switch element 535. The second selection circuit 540 includes a third switch element 544 and a fourth switch element 545. Similarly, the antenna system 500 operates in either a first mode, a second mode, or a third mode by controlling the first selection circuit 530 and the second selection circuit 540. For example, in the first mode, the first selection circuit 530 and the second selection circuit 540 may select the first transmission line 551 and the fourth transmission line 554. In the second mode, the first selection circuit 530 and the second selection circuit 540 may select the second transmission line 552 and the fifth transmission line 555. In the third mode, the first selection circuit 530 and the second selection circuit 540 may select the third transmission line 553 and the sixth transmission line 556. However, the invention is not limited to the above.

Each of the first antenna element 521 and the second antenna element 522 may be a square patch antenna. In addition, each of the first floating metal element 598 and the second floating metal element 599 may substantially have a circular shape, and they are completely separate from the first antenna element 521 and the second antenna element 522. Specifically, the first floating metal element 598 is adjacent to the first antenna element 521, so as to increase the radiation gain of the first antenna element 521, and the second floating metal element 599 is adjacent to the second antenna element 522, so as to increase the radiation gain of the second antenna element 522. It should be noted that the term “adjacent” or “close” over the disclosure means that the distance (spacing) between two corresponding elements is smaller than a predetermined distance (e.g., 10 mm or shorter), but often does not mean that the two corresponding elements directly touch each other (i.e., the aforementioned distance/spacing therebetween is reduced to 0).

Figure 6:
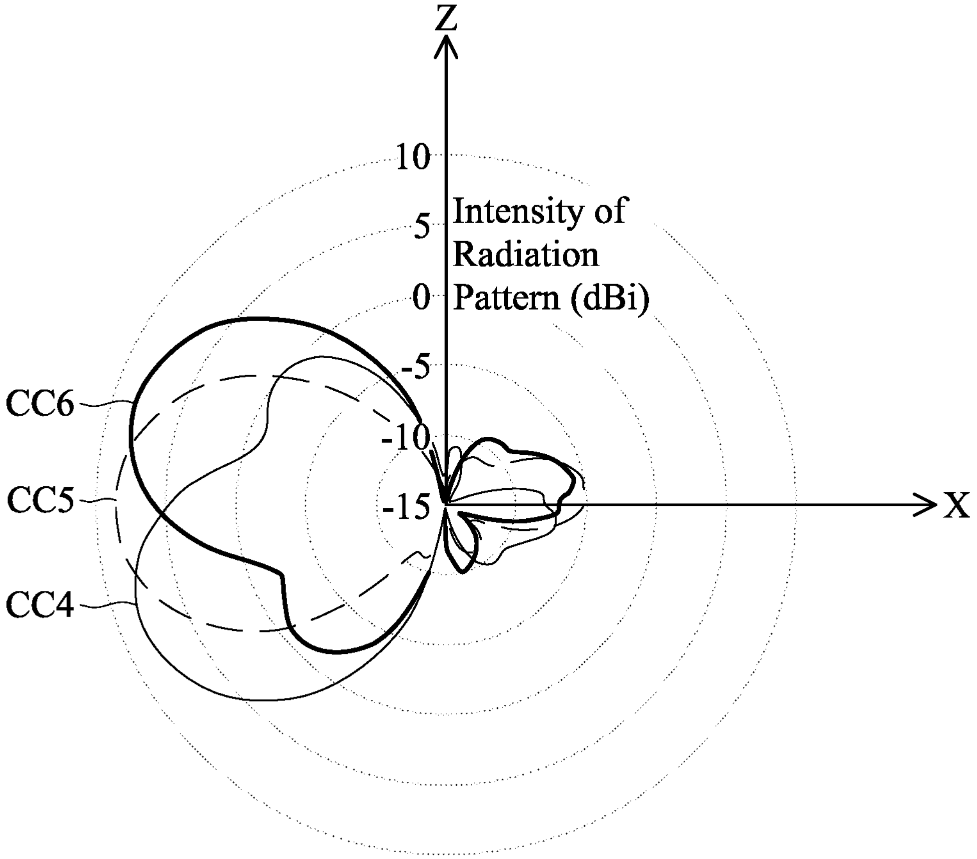
FIG. 6 is a radiation pattern of an antenna system according to an embodiment of the invention.

FIG. 6 is a radiation pattern of the antenna system 500 according to an embodiment of the invention. As shown in FIG. 6, a fourth curve CC4 represents the radiation characteristics of the antenna system 500 operating in the first mode, a fifth curve CC5 represents the radiation characteristics of the antenna system 500 operating in the second mode, and a sixth curve CC6 represents the radiation characteristics of the antenna system 500 operating in the third mode. Therefore, the antenna system 500 of the invention can provide a switchable radiation pattern by appropriately controlling the first selection circuit 530 and the second selection circuit 540. Other features of the antenna system 500 of FIG. 5A and FIG. 5B are similar to those of the antenna system 100 of FIG. 1. Accordingly, the two embodiments can achieve similar levels of performance.

Figure 7:
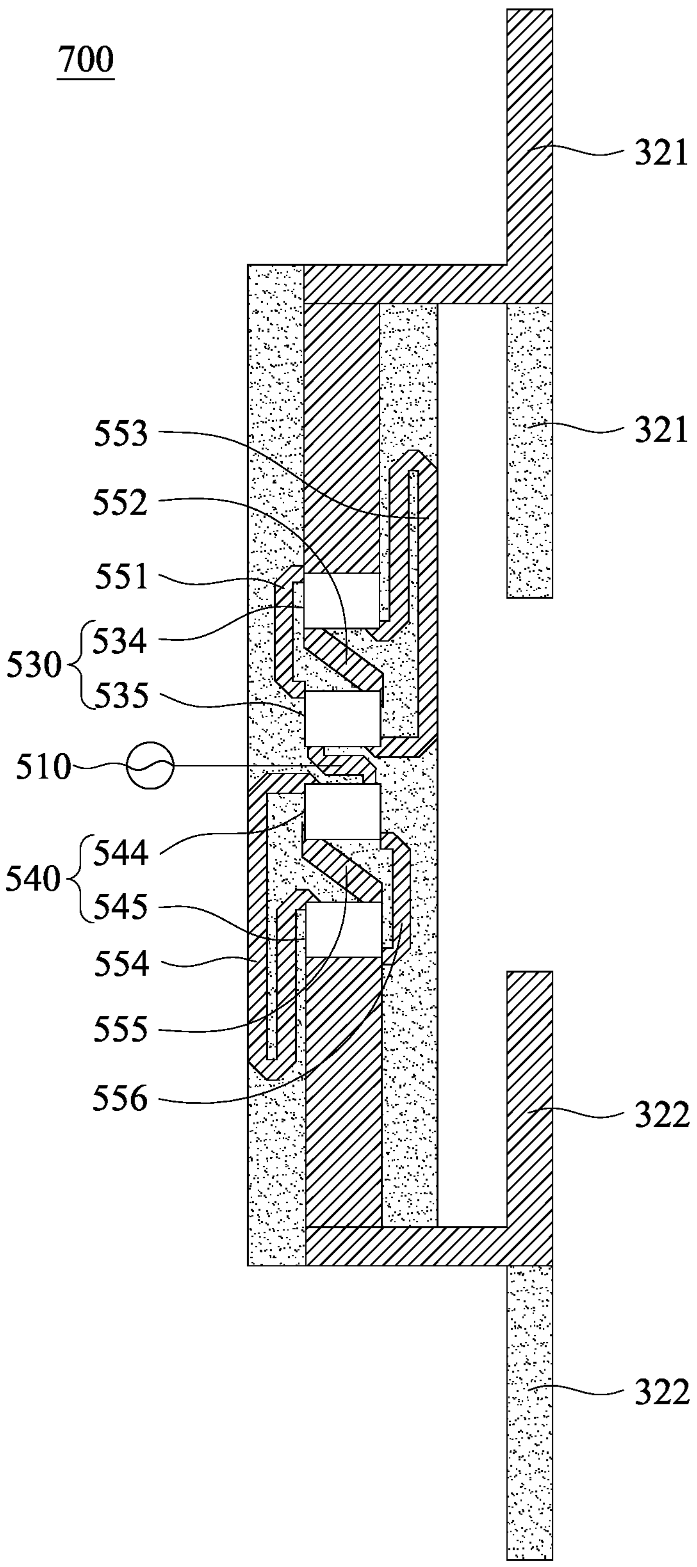
FIG. 7 is a top view of an antenna system according to an embodiment of the invention.

FIG. 7 is a top view of an antenna system 700 according to an embodiment of the invention. FIG. 7 is similar to FIG. 5A and FIG. 5B. In the embodiment of FIG. 7, the aforementioned patch antennas are replaced by the first antenna element 321 and the second antenna element 322 (dipole antennas). Other features of the antenna system 700 of FIG. 7 are similar to those of the antenna system 500 of FIG. 5A and FIG. 5B. Accordingly, the two embodiments can achieve similar levels of performance.

The invention proposes a novel antenna system. In comparison to the conventional design, the invention has at least the advantages of switchable radiation pattern, small size, and low manufacturing cost. Therefore, the invention is suitable for application in a variety of communication devices.

Note that the above element sizes, element shapes, and frequency ranges are not limitations of the invention. An antenna designer can fine-tune these settings or values according to different requirements. It should be understood that the antenna system of the invention is not limited to the configurations of FIGS. 1-7. The invention may merely include any one or more features of any one or more embodiments of FIGS. 1-7. In other words, not all of the features displayed in the figures should be implemented in the antenna system of the invention.

Use of ordinal terms such as “first”, “second”, “third”, etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna system, comprising:

a signal feeding element, respectively coupled to a first connection point and a second connection point;

a first antenna element, coupled to a third connection point;

a second antenna element, coupled to a fourth connection point;

a first transmission line;

a second transmission line;

a third transmission line;

a first selection circuit, selecting one of the first transmission line, the second transmission line, and the third transmission line as a first target transmission line, wherein the first target transmission line is coupled between the third connection point and the first connection point;

a fourth transmission line;

a fifth transmission line;

a sixth transmission line; and a second selection circuit, selecting one of the fourth transmission line, the fifth transmission line, and the sixth transmission line as a second target transmission line, wherein the second target transmission line is coupled between the fourth connection point and the second connection point.

2. The antenna system as claimed in claim 1, wherein the antenna system provides a switchable radiation pattern by using the first selection circuit and the second selection circuit.

3. The antenna system as claimed in claim 1, wherein the antenna system covers an operational frequency band from 5150 MHz to 5850 MHz.

4. The antenna system as claimed in claim 3, further comprising:

a third antenna element, coupled to the first connection point; and a fourth antenna element, coupled to the second connection point.

5. The antenna system as claimed in claim 4, wherein a distance between the third antenna element and the fourth antenna element is from 0.24 to 0.3 wavelength of the operational frequency band.

6. The antenna system as claimed in claim 3, further comprising:

a fifth antenna element, coupled to a fifth connection point;

a sixth antenna element, coupled to a sixth connection point;

a seventh transmission line;

an eighth transmission line;

a ninth transmission line; and a third selection circuit, selecting one of the seventh transmission line, the eighth transmission line, and the ninth transmission line as a third target transmission line, wherein the third target transmission line is coupled between the fifth connection point and the third connection point.

7. The antenna system as claimed in claim 6, further comprising:

a tenth transmission line;

an eleventh transmission line;

a twelfth transmission line; and a fourth selection circuit, selecting one of the tenth transmission line, the eleventh transmission line, and the twelfth transmission line as a fourth target transmission line, wherein the fourth target transmission line is coupled between the sixth connection point and the fourth connection point.

8. The antenna system as claimed in claim 7, wherein a length of the first transmission line is longer than or equal to that of the seventh transmission line, and a length of the tenth transmission line is longer than or equal to that of the fourth transmission line.

9. The antenna system as claimed in claim 7, wherein a length of each of the first transmission line and the seventh transmission line is from 0.25 to 0.31 wavelength of the operational frequency band, and wherein a length of each of the fourth transmission line and the tenth transmission line is from 0.69 to 0.85 wavelength of the operational frequency band.

10. The antenna system as claimed in claim 7, wherein a length of the second transmission line is substantially equal to that of the eighth transmission line, and a length of the eleventh transmission line is substantially equal to that of the fifth transmission line.

11. The antenna system as claimed in claim 7, wherein a length of each of the second transmission line, the fifth transmission line, the eighth transmission line, and the eleventh transmission line is from 0.16 to 0.19 wavelength of the operational frequency band.

12. The antenna system as claimed in claim 7, wherein a length of the third transmission line is shorter than or equal to that of the ninth transmission line, and a length of the twelfth transmission line is shorter than or equal to that of the sixth transmission line.

13. The antenna system as claimed in claim 7, wherein a length of each of the third transmission line and the ninth transmission line is from 0.69 to 0.85 wavelength of the operational frequency band, and wherein a length of each of the sixth transmission line and the twelfth transmission line is from 0.25 to 0.31 wavelength of the operational frequency band.

14. The antenna system as claimed in claim 1, wherein a length of the fourth transmission line is longer than or equal to that of the first transmission line.

15. The antenna system as claimed in claim 1, wherein a length of the fifth transmission line is substantially equal to that of the second transmission line.

16. The antenna system as claimed in claim 1, wherein a length of the sixth transmission line is shorter than or equal to that of the third transmission line.

17. The antenna system as claimed in claim 1, wherein each of the first antenna element and the second antenna element is a dipole antenna.

18. The antenna system as claimed in claim 1, wherein each of the first antenna element and the second antenna element is a patch antenna.

19. The antenna system as claimed in claim 1, further comprising:

a first feeding line, coupled between the first connection point and the signal feeding element; and a second feeding line, coupled between the second connection point and the signal feeding element.

20. The antenna system as claimed in claim 1, wherein if the first transmission line, the second transmission line, and the third transmission line have same lengths, the fourth transmission line, the fifth transmission line, and the sixth transmission line have different lengths, or wherein if the fourth transmission line, the fifth transmission line, and the sixth transmission line have same lengths, the first transmission line, the second transmission line, and the third transmission line have different lengths.

* * * * *